United States Patent [19]

Meyer

[11] 4,106,175
[45] Aug. 15, 1978

[54] METHOD AND APPARATUS FOR MANUFACTURING COMBINATION SHOCK ABSORBERS AND LEVELING STRUTS

[75] Inventor: Robert R. Meyer, Monroe, Mich.

[73] Assignee: Monroe Auto Equipment Company, Monroe, Mich.

[21] Appl. No.: 668,916

[22] Filed: Mar. 22, 1976

Related U.S. Application Data

[62] Division of Ser. No. 424,294, Dec. 13, 1973, Pat. No. 3,967,363.

[51] Int. Cl.$^2$ ............................................. B23P 19/08
[52] U.S. Cl. .................................. 29/243.52; 72/402; 29/243.56
[58] Field of Search .......... 72/402; 29/243.52, 243.56, 29/243.5

[56] References Cited

U.S. PATENT DOCUMENTS

| | | | |
|---|---|---|---|
| 2,295,033 | 9/1942 | Fagan | 72/402 |
| 2,405,399 | 8/1946 | Bugg et al. | 29/243.52 |
| 2,546,496 | 3/1951 | Crawford | 72/402 |
| 2,951,401 | 9/1960 | Johnson | 72/402 |
| 3,143,903 | 8/1964 | Van Hecke | 29/243.52 |
| 3,201,969 | 8/1965 | Harrison et al. | 72/402 |
| 3,416,213 | 12/1968 | Cootes | 72/402 |
| 3,568,494 | 3/1971 | Geisman | 72/402 |
| 3,720,088 | 3/1973 | Pauly et al. | 72/402 |
| 3,800,386 | 4/1974 | Bishop | 72/402 |
| 3,879,834 | 4/1975 | Johnson | 72/402 |

Primary Examiner—C.W. Lanham
Assistant Examiner—Daniel C. Crane
Attorney, Agent, or Firm—Harness, Dickey & Pierce

[57] ABSTRACT

A method and apparatus for assembling combination shock absorbers and leveling struts of the type comprising a telescopic direct acting shock absorber having a reciprocable piston and piston rod, with the piston rod carrying a cylindrical dirt shield which cooperates with a rolling or flexible diaphragm member extending between the body of the shock absorber and the dirt shield in defining a variable volume pressurizable chamber. The dirt shield is displaced relative to the shock absorber in response to the magnitude of pressure maintained in the chamber whereby to selectively control the attitude between sprung and unsprung portions of a vehicle. The method and apparatus of the present invention includes means for initially inserting one end of the diaphragm around the body of the shock absorber for selectively gauging the axial location thereon and thereafter for crimping a suitable clamping ring around the outer periphery of one end of the diaphragm so as to fixedly and sealingly secure the one end to the body of the shock absorber. Means are then provided for selectively inverting an opposite end of the diaphragm, for sleeving the same over the adjacent end of the dirt shield, and for pressurizing the unit so as to properly axially position the diaphragm with respect to the dirt shield. In this position, the opposite end of the diaphragm is clampingly secured to the end of the dirt shield, whereby the diaphragm and dirt shield will cooperate with the body of the shock absorber in defining the aforesaid pressurizable chamber.

5 Claims, 15 Drawing Figures

METHOD AND APPARATUS FOR MANUFACTURING COMBINATION SHOCK ABSORBERS AND LEVELING STRUTS

This is a division of application Ser. No. 424,294, now U.S. Pat. No. 3,967,363, filed Dec. 13, 1973.

SUMMARY OF THE INVENTION

The present invention relates generally to vehicular shock absorbers of the type which utilizes a pressurizable chamber adapted to be selectively pressurized in order to effect a leveling of the sprung portion of a vehicle with respect to the unsprung portion thereof. More particularly, the present invention is directed toward a new and improved method and apparatus for assembling such combination shock absorbers and leveling struts, whereby a minimum number of manufacturing steps are required so that the unit may be manufactured in an extremely simple and economical manner.

It is accordingly a general object of the present invention to provide a new and improved method and apparatus for assembling combination shock absorber and leveling struts for use in automotive vehicles and the like.

It is a more particular object of the present invention to provide a new and improved method for assembling combination shock absorbers and leveling struts, as above described, which minimizes to the extreme the number of successive operational steps and which provides a well constructed, reliable unit.

It is another object of the present invention to provide a new and improved method, as above described, which assures for close quality control and which utilizes a minimum amount of tooling and related manufacturing equipment.

It is still another object of the present invention to provide a new and improved apparatus for assembling combination shock absorbers and leveling struts, which apparatus is adapted to fixedly and sealingly secure the opposite ends of the flexible diaphragm to the body of the shock absorber and associated dirt shield, respectively.

It is a related object of the present invention to provide a new and improved means for selectively sleeving one end of the diaphragm over the outer periphery of the adjacent end of the dirt shield in a rapid and effective manner which assures for positive sealing engagement therebetween.

It is a further object of the present invention to provide a new and improved method for assembling flexible diaphragms on the dirt shield of combination shock absorbers and leveling struts wherein one end of the diaphragm is selectively positioned with respect to the associated dirt shield in response to introducing a pressurized media in the variable volume chamber.

Other objects, features and advantages of the present invention will become apparent from the following detailed description taken in conjunction with the accompanying drawings.

BRIEF DESCRIPTION OF THE DRAWINGS

FIG. 8 is a sectional side elevation of a preferred apparatus for crimply attaching the clamping rings in accordance with the steps of the method illustrated in FIGS. 4 and 7;

DETAILED DESCRIPTION OF THE INVENTION

Figure 1:
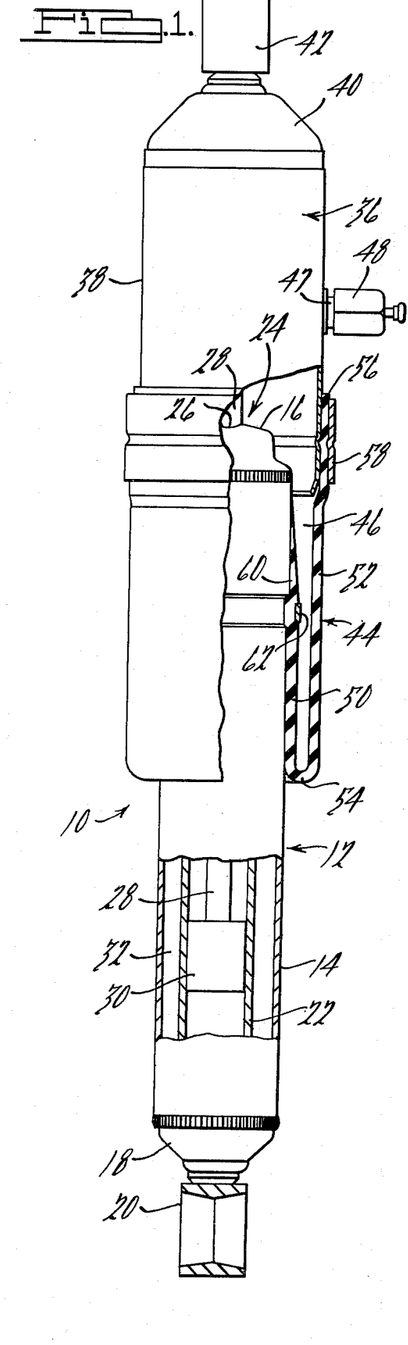
FIG. 1 is a side elevational view with parts broken away of an exemplary combination shock absorber - leveling strut which is adapted to be manufactured in accordance with the method and apparatus of the present invention.

Referring now in detail to the drawings and in particular to FIG. 1 thereof, a combination shock absorber-leveling unit or strut 10 which is adapted to be constructed in accordance with the method and apparatus of the present invention, is adapted to be operatively mounted between sprung and unsprung masses of an automotive vehicle or the like in substantially the same location that a conventional shock absorber normally occupies adjacent each of the suspension spring means of the vehicle. Accordingly, the unit 10 is adapted to function solely as a shock absorber to dampen relative movement between the sprung and unsprung masses when an associated variable volume chamber is not pressurized. However, in response to pressurizing the chamber to some pre-determined magnitude, the unit elongates to displace the sprung mass relative to the unsprung mass whereby to optimize the stabilization of the vehicle and achieve relatively level vehicular attitude, as will be appreciated by those skilled in the art. The strut 10 may be of various constructions well known in the art and for purposes of description, is shown generally as comprising a direct acting tubular shock absorber assembly 12. The assembly 12 includes an external cylindrically shaped reserve tube or body member 14 which is closed at the upper and lower ends thereof by suitable end cap members 16 and 18, respectively. The lower cap member 18 is provided with a conventional mounting ring or similar attachment element 20 which is designed to be operatively secured to the unsprung mass of the associated vehicle, such as by way of example, to the axle assembly thereof. Disposed interiorly of the body member 14, is an elongated cylindrical pressure cylinder 22, the upper end of which is provided with guide means 24 defining a bore 26 within which an elongated piston rod 28 is reciprocally mounted. The lower end of the piston rod 28 is operatively connected to a piston assembly, generally designated by the numeral 30 which may be of any suitable construction well known in the art which is provided with conventional compression and rebound control valves or the like (not shown). The annular space between the outer periphery of the reserve tube 14 defines a fluid reservoir 32 which is adapted to contain hydraulic fluid which cooperates with the valves of the piston in damping movement of the sprung portion of the associated vehicle with respect to the unsprung portions thereof.

The unit 10 also comprises a generally cup shaped enclosure member or dirt shield 36, having a skirt section 38 arranged coaxially of the shock absorber assembly 12 and spaced radially outward therefrom. The base of the shield 36 is formed by an upper end cap 40 which is fixedly secured to the piston rod 28 and carries a suitable upper attachment ring or element 42 adapted to be secured to the sprung portion of the associated vehicle, as is conventional in the art. The opposite end of the shield 36 is connected to the shock absorber 12 by an elongated, generally tubular shaped diaphragm member, generally designated by the numeral 44. The member 44 is fabricated of a flexible material, such as molded rubber or the like which may, if desired, be reinforced with a suitable fabric for purposes of reinforcement. The member 44 cooperates with the inner periphery of the dirt shield 36 and the outer periphery of the reserve tube 14 in defining an enclosed pressurizable chamber 46 into which pressurized gas, such as compressed air or the like, is adapted to be supplied from a source via a suitable valve assembly 48 supported by a threaded nipple 47 connected to the dirt shield 36. The diaphragm member 44 comprises a generally cylindrically disposed inner wall section 50 and a generally cylindrically shaped outer wall section 52 which are interconnected by an integral return bend section 54, with the section 54 being composed of relative portions of the wall sections 50 and 52 as reciprocation occurs between the reserve tube 14 and the dirt shield 36. The outer wall section 52 comprises a free end portion 56 which is adapted to be fixedly clampingly secured around the outer periphery of the lower end of the dirt shield 36 by means of a clamping ring 58, while the inner wall section 50 comprises a free end portion 60 which is adapted to be fixedly secured by means of a clamping ring 62 to the outer periphery of the upper end of the body member 14, with the clamping rings 58 and 62 serving to provide a fluid tight seal at the opposite ends of the diaphragm 44 to facilitate selective pressurization of the chamber 46 and correspondingly elongation of the unit 10.

The subject invention is addressed to a method and apparatus for assembling a combination shock absorber-leveling strut 10 of the above character. The present invention, however, is not intended to in any way be limited to the specific exemplary unit shown in FIG. 1 and it will be appreciated that the above description is presented merely to describe an exemplary embodiment of a typical combination shock absorber-leveling strut which may be advantageously constructed in accordance with the method and apparatus of the present invention.

As will hereinafter be described in detail, the subject invention pertains to a method for assembling opposite ends of the diaphragm 44 to the dirt shield 36 and the reserve tube 14. Moreover, to facilitate the assembly of the combination shock absorber-leveling strut 10 in accordance with the various steps of the method, the present invention also includes the apparatus for performing the steps such as, for example, the machine for crimping the clamping rings 58 and 62 to the dirt shield 36 and reserve tube 14 respectively, the apparatus for inverting and subsequently sleeving the diaphragm 44 around the open end of the shield 36 and the fixture for axially locating the rolled or return bend 54 of the diaphragm 44 relative to the open end of the dirt shield 36. Generally speaking, and in accordance with the method of manufacture of the subject invention, the combination shock absorber-leveling strut 10 is assembled by a method which comprises the steps of initially inserting one end of the diaphragm around the reserve tube 14 of the assembly 12, selectively gauging the axial location of the diaphragm 44 relative to the reserve tube 14 and the clamping ring 62 relative to the dirt shield 36, crimping the clamping ring 62 around the outer periphery of the diaphragm 44, inverting an opposite end of the diaphragm 44 and sleeving the same over the adjacent end of the dirt shield 36, pressurizing the chamber 46 to properly axially position the return bend 54 of the diaphragm 44 with respect to the open end of the dirt shield 36, and crimping the clamping ring 58 to secure the opposite end of the diaphragm 44 to the dirt shield 36. The above indicated steps are illustrated in sequence in FIGS. 2–7 of the drawings.

Figures 2, 3:
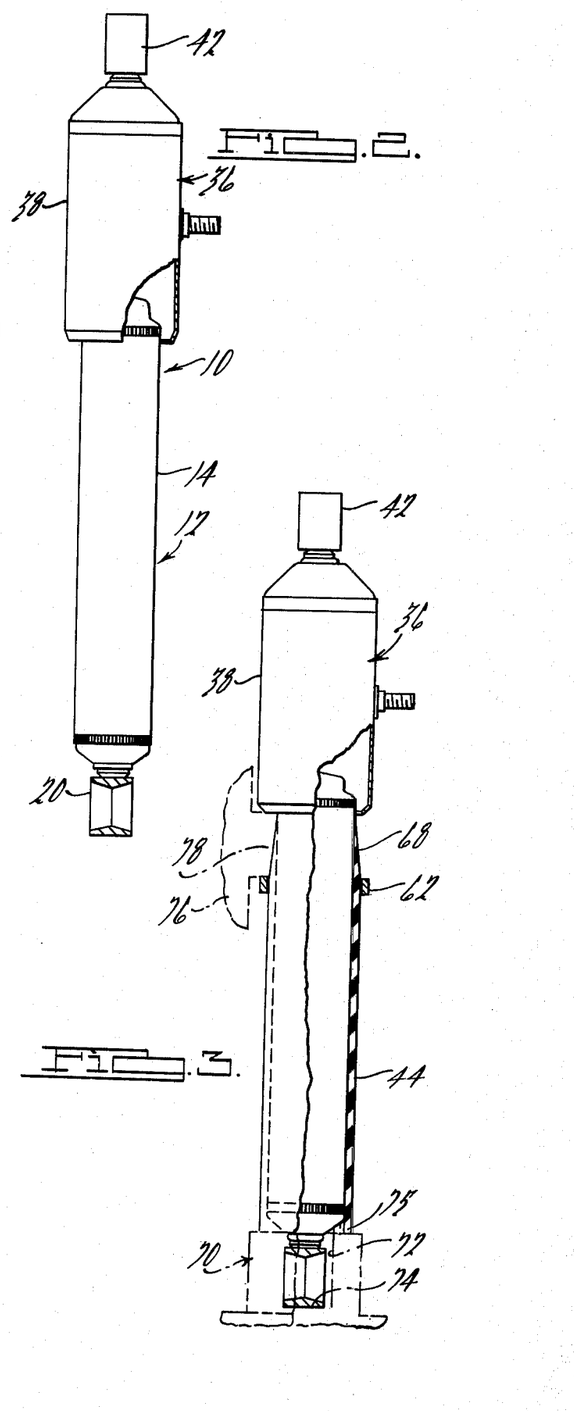
FIGS. 2-7 are a sequential series of side elevational views of the shock absorber-leveling unit illustrated in FIG. 1 depicting the various steps of assembly in accordance with the preferred method of the present invention.

With reference to FIG. 2, the shock absorber 12 including the dirt shield 36 and the mounting or attachment rings 20 and 42, are initially preassembled, the fluid reservoir 32 is fully charged with a hydraulic liquid and the piston assembly 30, which carries the dirt shield 36, is disposed in its furthest axially elongated position. For the purpose of locating and connecting opposite end sections of the diaphragm 44 in predetermined axial location relative to the shock absorber 12, the clamping ring 62 is precisely located relative to the reserve tube 14. Correspondingly, the clamping ring 58 also is precisely located relative to the dirt shield 36. As shall hereinafter be more fully described, the method of assembly further encompasses crimpingly connecting each of the clamping rings 58 and 62 to the shock absorber 12, whereby to fixedly secure opposite ends of the diaphragm 44 to the reserve tube 14 and the dirt shield 36 respectively.

The sequence of assembly initially includes the step of telescopically inserting the diaphragm 44 around the body of the reserve tube 14 in a manner to selectively gauge the axial location of the relative end portions thereof, including axial placement of the clamping ring 62 in a preselected location on the reserve tube 14. In this regard, and with reference to FIG. 3, the clamping ring 62 is initially preassembled about the outer periphery of the diaphragm 44. To facilitate the preassembly, the upper end of the diaphragm 44 is provided with an axially extending tapered section 68, the crown of which is adapted to roughly position the ring 62 relative to the diaphragm 44. The diaphragm 44, including the clamping ring 62, is then slidably inserted on the reserve tube 14 and precisely positioned relative to a preselected reference surface as can be provided by an exemplary gauge means 70. By way of example, the gauge means 70 can be provided with a recess 72 dimensioned to receive the mounting ring 20 and can include a lower wall 74 which is selectively spaced below an annular shaped shoulder 75. The wall 74 and shoulder 75 can be utilized as reference points in locating the lower end of the diaphragm 44 relative to the reserve tube 14. Note that when the lower surface of the mounting ring 20 engages the wall 74, the diaphragm 44 will be precisely and preselectively axially located relative to the reserve tube 14 in accordance with the preselected spacing. Moreover, a suitable gauge means 76, having a gauging finger 78, can be provided for axially locating the clamping ring 62 a preselected axial distance from the lower or open end of the dirt shield 36. In this position, the step of crimping the ring 62 in accordance with the step of the method illustrated in FIG. 4 can be accomplished whereby the end of the diaphragm 44 can be fixedly and sealingly connected to the reserve tube 14 and form an annularly shaped recess 64 thereabout.

Figures 4, 5:
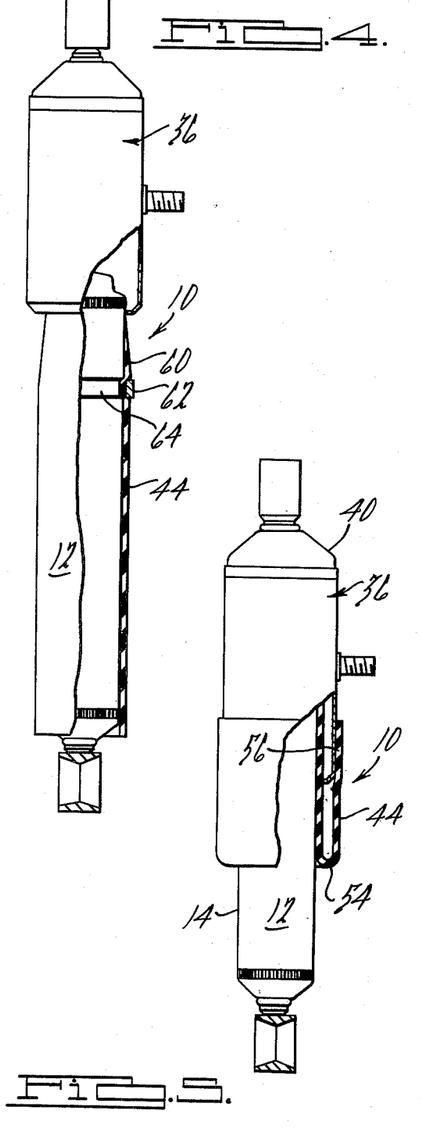
Figure 9:
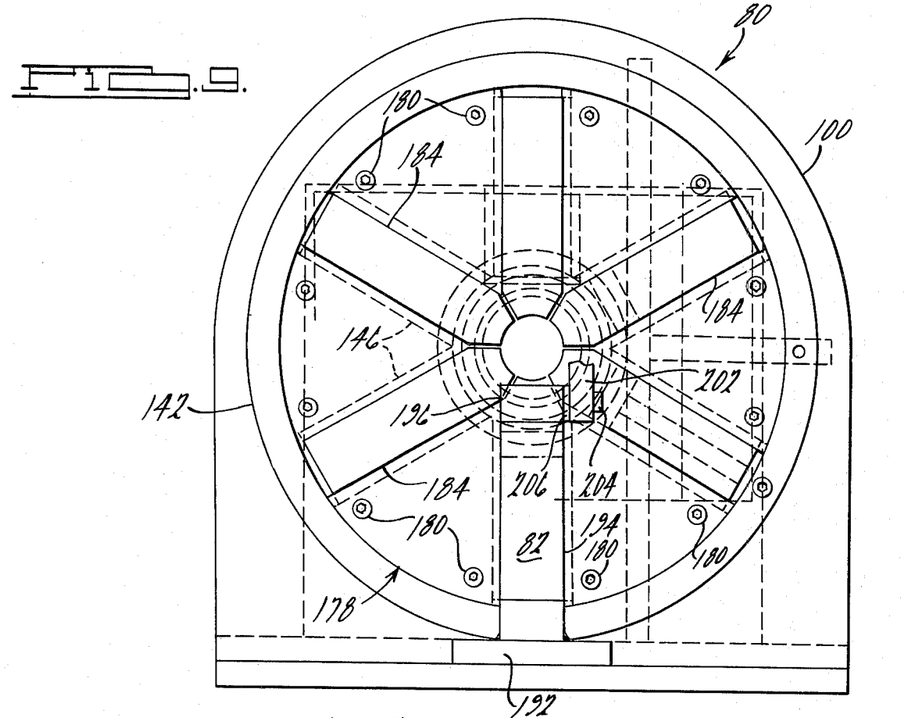
FIG. 9 is an end view of the apparatus illustrated in FIG. 8 looking in the direction of the arrow 9.

The crimping step, as illustrated in FIG. 4, is performed by an apparatus comprising a crimping machine and a supporting fixture which are indicated generally at 80 and 82 respectively in FIGS. 8 and 9 of the drawings. The machine 80 is comprised of a support structure 84 of preferably welded construction, a crimping mechanism 104, and a power cylinder 106 drivingly connected to the mechanism 104. The structure 84 includes a base member 86 which is fixedly connected to a top surface 88 of a suitable work table or the like by a plurality of suitable fastener means 90. The right end of the member 86, as viewed in FIG. 8, is connected to the lower end of an upwardly extending end wall 92, the latter including an enlarged cylindrically shaped opening or passage 94 adapted to receive an end section of a tubular shaped sleeve element 96. The opposite end of the element 96 is disposed in an identically formed opening 98 located in a mounting plate 100. In a preferred construction, the mounting plate 100 and end wall 92 are connected by one or more longitudinally extending web sections 102.

In the subject invention, the crimping mechanism 104 is actuated in response to displacement of the power cylinder 106. The cylinder 106 is mounted on the end wall 92 by a plurality of suitable bolts, screws or the like 108 and selectively axially spaced therefrom by stop and spacer elements 110 and 112 respectively. The stop element 110 is connected to the end wall 92 by a plurality of bolts, screws or the like 114, and includes a radially extending shoulder 116 disposed in an internal, cylindrically shaped opening or passage 118 which functions as a locator means for precisely limiting the inward movement of the jaws or dies of the crimping mechanism 104, as will hereinafter be described in detail, whereas the spacer element 112 permits coaxial alignment of the cylinder 106 relative to the axis of the sleeve 96. Preferably, the shoulder 116 and the spacer element 112 are ground flush after assembly of the mechanism 80 whereby to align the cylinder 106 and to preset the inward position of each of the jaws or dies.

The power cylinder 106 includes a stub shaft 120 having an outer threaded section 122 which is drivingly connected to the right end of an elongated, tubular shaped shaft 124. The shaft 124 is non-rotatably secured relative to the stub shaft 120 by a roll pin 126 which is engaged in aligned apertures formed in each of the shafts 120 and 124. Correspondingly, to preclude relative rotational movement between the sleeve 96 and the shaft 124, the latter is provided with an axially extending groove or recess 128 which is formed in the outer peripheral surface thereof. The groove 128 is engaged by an end section of a locator pin 130, an opposite end of the pin being supported in a threaded aperture 131 extending through each of the walls of the sleeve 96 and a cap member 133. In the subject mechanism 80, the sleeve 96 functions to slidably support the shaft member 124 which in turn is utilized for engageably receiving and guiding one end of the combination shock absorber-leveling strut 10. To slidably support the shaft 124, a pair of cylindrically shaped bearing sleeves or liners 132 and 134 are located at opposite ends of the sleeve 96. With respect to the guide means for engageably receiving the combination unit 10, a pair of circumferentially spaced roller elements 132 and 134 are rotatably supported in the lower left end of the shaft member 124.

An enlarged cylindrically shaped cavity 136 is formed circumjacently about the left end of the shaft 124 wherein a connecting means is located to translate the reciprocal motion provided by the power cylinder 106 whereby to actuate the crimping mechanism 104. The mechanism 104 is carried on the left or outer surface of the mounting plate 100 and fixedly connected at one axial end by a plurality of bolts or cap screws, one of which is indicated at 138. The mechanism 104 includes an outer housing formed by an enlarged, ring shaped housing member 140 which is connected at an opposite axial end to a guide plate 142. The left or outer surface of the guide plate 142 is provided with a plurality of circumferentially spaced, radially extending grooves 144, each groove 144 being adapted to slidably support a generally rectangularly shaped slide member 146 (see FIG. 11).

Figures 10, 11:
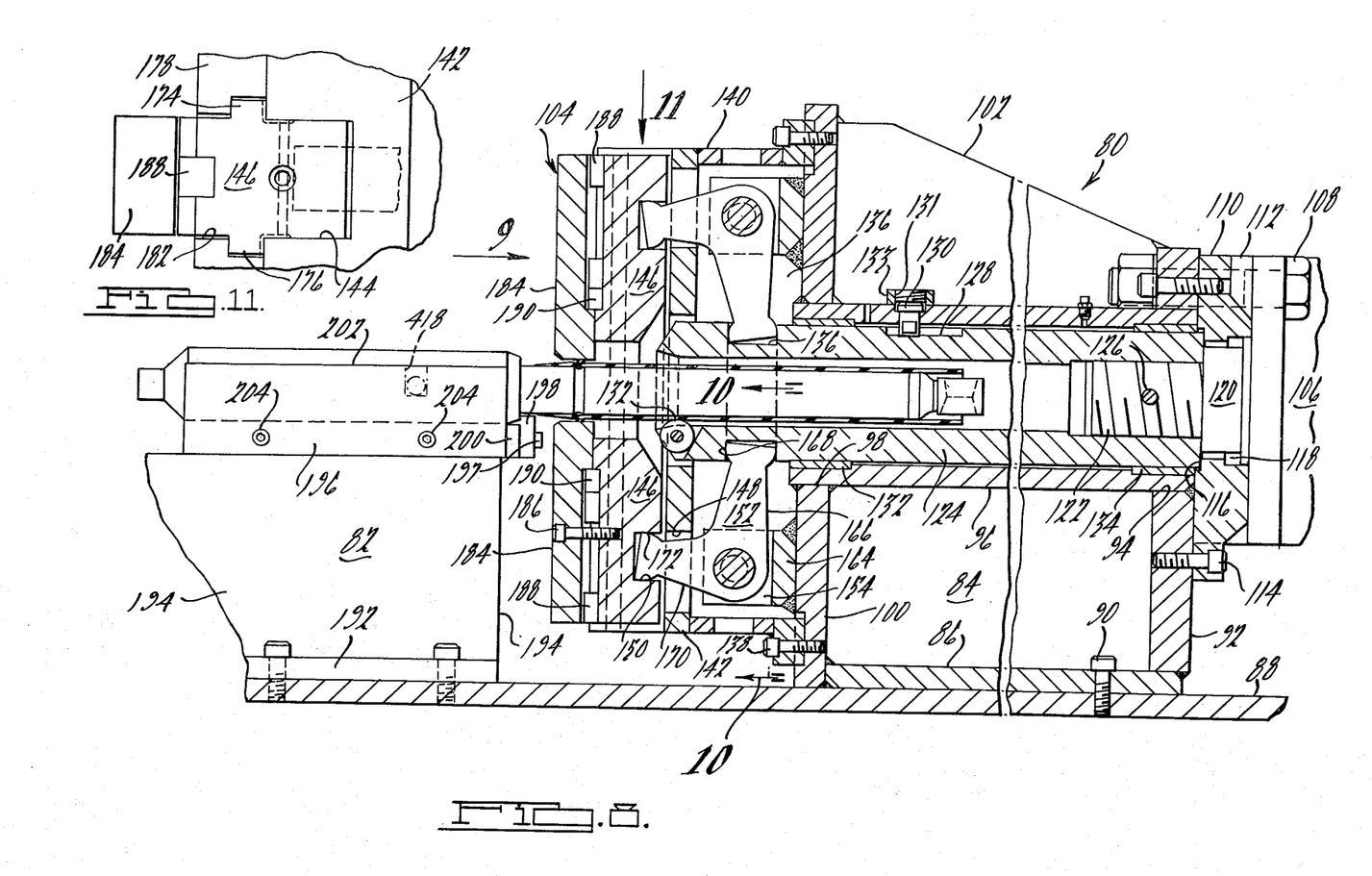
FIG. 10 is a fragmentary transverse cross-sectional view of the apparatus illustrated in FIG. 8 taken along the lines 10-10 thereof.
FIG. 11 is a fragmentary plan view of the apparatus illustrated in FIG. 8 looking in the direction of the arrow 11.
Figure 10:
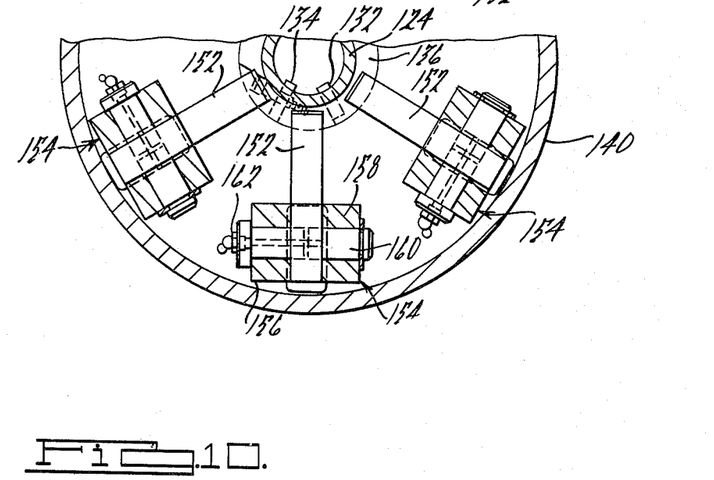

In the subject apparatus, each of the slide members 146 are radially displaced in response to axial movement of the shaft 124 through a driving connection provided by a plurality of bell cranks 152, the number of cranks corresponding to the number of slide members 146. Each of the bell cranks 152 are substantially L-shaped and each are supported for pivotal movement by a bifurcated or U-shaped bracket 154. As best seen in FIG. 10 each of the bell cranks 152 are located or interposed between parallel spaced side sections 156 and 158 of the bracket 154 and pivotably connected thereto by a suitable connecting pin or rod 160, the connection preferably including a suitable lube fitting 162 or the like. Each of the side sections 156 and 158 project outwardly and to the left relative to a generally rectangularly shaped base portion 164, the latter being preferably connected by welding to the mounting plate 100. Each of the bell cranks 152 comprise a first arm section 166 having a camming surface 168 located in a recess 136 formed in the shaft 124, and a second arm 170 extending through a passageway 148 formed in the plate 142, the arm 170 having a camming surface 172 disposed in a rectangularly shaped groove 150 formed in the slide member 146. Accordingly, in response to displacement of the shaft 124, to the left as viewed in FIG. 8, the plurality of bell cranks 152 are subject to pivot in a clockwise direction whereby to urge the slide members 146 radially outward relative to the central longitudinal axis of the shaft 124. Conversely, as the shaft 124 is drivingly displaced to the right, the bell cranks 152 are subject to pivot in a counterclockwise direction whereby to displace the slide members 146 inwardly in a radial direction, (i.e. towards the central longitudinal axis of the shaft 124). As best seen in FIG. 11, each of the slide members 146 include laterally extending flange or guide sections 174 and 176, the inner surface of which abuts against the left or outer surface of the guide plate 142. Each of the members 146 are slidably retained in the grooves 144 by a circularly shaped stay or retainer plate 178, the latter being fixedly connected to the outer surface of the guide plate 142 by a plurality of bolts or cap screws indicated generally in FIG. 9 at 180.

In the subject invention, the slide members 146 are each adapted to operatively support a die or crimping finger element 184. The elements 184 are detachably connected to the members 146 by suitable bolts, screws or the like 186 and selectively aligned and positioned by means of radially spaced key members 188 and 190. The radial inward end section of each of the fingers 184 (see FIG. 9) are tapered to provide a predetermined clearance between end sections of adjacent fingers whereby the end sections substantially fully encircle the clamping ring 62 during the crimping operation. The plurality of fingers 184 are adapted to collectively engage the outer periphery of the retainer ring 62 whereby to provide an applied compressive force to the outer periphery of the ring 62 which is substantially circumferentially continuous.

In the subject invention, suitable alignment means are provided for locating the retainer ring 62 concentrically relative to the inner periphery of the fingers 184. This function is achieved by the supporting fixture 82, which is located to the left of the crimping mechanism 104 as viewed in FIG. 8. The fixture 82 is comprised of a base 192 fixedly connected to the worktable 88, and a vertically extending web 194 which carries a locator plate 196 on an upper surface thereof. A stop element 198 is detachably connected to the right end of the plate 196 by a suitable bolt or cap screw 197 and selectively axially spaced via a washer 200. The element 198 projects upwardly relative to the upper surface of the plate 196 and defines a vertically extending shoulder which is adapted to locatably receive the open end of the dirt shield 36.

The supporting fixture 82 also functions to laterally coaxially space the leveling strut 10 with respect to the central longitudinal axis of the mechanism 104. As best seen in FIG. 9, a retaining plate 202 is disposed along one side of the plate 196 and laterally spaced from the central axis of the mechanism 104 a distance conforming to the radius of the dirt shield 36. The retaining plate 202 is detachably connected to the plate 196 by suitable fasteners 204 and in view of accommodating the dirt shields or varying diameters, various spacer or washer elements 206 can also be interposed between the plate 202 and an outer lateral surface of the web 194. It will be noted that since the clamping ring 62 has previously been axially located with respect to the dirt shield 36, that by positioning the shield 36 against the stop 198 and plate 202 respectively, that the ring 62 will accordingly be precisely positioned with respect to the crimping fingers 184 whereby the ring 62 can be crimped to fixedly and sealingly secure one end of the diaphragm 44 to the body member 14.

With reference to FIG. 5, the next step in assembling the combination shock absorber-leveling unit 10 is to invert the diaphragm 44 and sleeve the end section 56 about the lower end of the dirt shield 36. During the inverting and sleeving step, the shock absorber assembly 12 is retracted relative to the dirt shield 36 whereby the end cap 16 is abutted or bottomed against the interior surface of the end cap 40. The retracting, inverting and sleeving steps are accomplished by a press or inverting apparatus indicated generally at 210 in FIG. 12.

Figure 12:
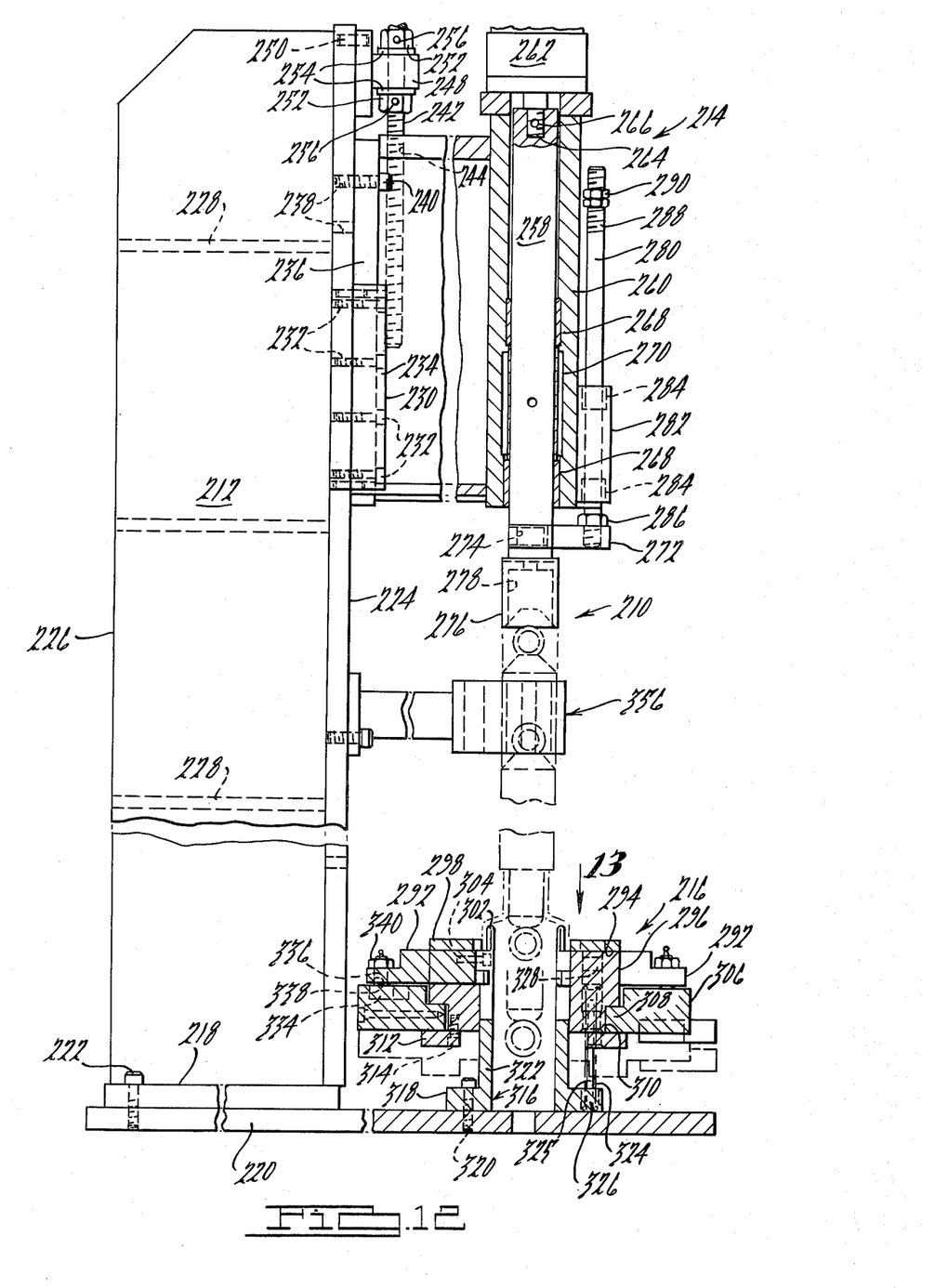
FIG. 12 is a side elevational view of a preferred apparatus for inverting the flexible diaphragm and for sleeving one end thereof to the dirt shield in accordance with the step of the method illustrated in FIG. 5.

Generally speaking, the apparatus 210 is comprised of a relatively stationary support structure 212, a vertically displaceable press assembly 214, and a finger mechanism 216 located below the assembly 214. The support structure 212 includes a base plate 218 which is fixedly mounted via a plurality of bolts, screws or the like 222 to the top of a suitable worktable or the like 220. The plate 218 is connected to a vertically extending column of welded construction comprised of a rigid end plate 224, a pair of laterally spaced side walls one of which is indicated at 226, and a plurality of vertically spaced reinforcing beams or teirs 228. The structure 212 also includes a pair of laterally spaced keeper blocks 230 which are fixedly connected to the end plate 224 by a plurality of vertically spaced bolts, screws or the like 232. Each of the blocks 230 include an inwardly extending lip or flange 234 which is adapted to slidably support or cradle a slide plate 236 of the assembly 214.

In the subject apparatus, the press 214 is adapted to be adjustably connected at selective vertical positions to the plate 224 whereby to permit the apparatus 210 to be utilized with a wide variety of differing shock absorber-leveling units 10. In this regard the plate 224 is provided with one or more rows of vertically spaced threaded apertures or slots 238 which can be selectively utilized to fixedly secure the plates 236 and 224 via insertion of suitable fasteners 240 but which will provide some degree of vertical movement without requiring the complete removal of the fasteners 240. The slide plate 236 and correspondingly the assembly 214 is movably located relative to the apertures 238 in response to rotation of a feed screw 242, the latter being threadably connected to an aperture 244 formed in a top plate 246 of the assembly 214. The feed screw 242 is rotatably supported in a bore formed in a support block 248, the latter being fixedly connected to the end plate 224 by suitable bolts, screws or the like 250. The feed screw 242 is axially immovably supported relative to the block 248 by a pair of vertically spaced nuts 252 and washers 254, the nuts 252 being non-rotatably secured to the feed screw 242 by suitable locking pins or the like 256. To vertically position the press 214 relative to the mechanism 216, the bolts 240 are removed and the feed screw 242 is rotated until the bolt holes of the plate 236 are again in registration with an aperture 238. The position of the assembly is then fixed by reinsertion of the bolts 240.

The assembly 214 is comprised of a shaft 258 slidably supported in outer housing 260. The upper end of the shaft 258 is drivingly connected to a fluid actuated power cylinder 262, the latter including a stub shaft 264 threadably connected to one end of the shaft 258, and having a roll pin 266 extending therebetween which is adapted to preclude relative rotational movement. The shaft 258 is guidably supported by the housing 260 via a pair of vertically spaced cylindrically shaped bushings 268 spaced on opposite ends of a section of tubing 270. The lower end of the shaft 258 carries a clamp member 272 having an aperture 274 adapted to detachably receive an attachment ring adaptor 276, the latter including a complementary recess 278 for nestingly receiving the upper attachment ring 42 of the combination shock absorber-leveling strut 10.

As indicated above, the press unit 214 is vertically adjustable relative to the support structure 212 with the unit 214 including means for further adjusting the displacement of the shaft 258 to accommodate combination shock absorber-leveling units 10 of differing dimensions. In this regard an elongated rod or shaft 280 is slidably supported in a casing or sleeve member 282 which in turn is connected to an outer surface of the housing 260. The member 282 carries fist and second axially spaced bushings 284 at opposite ends, and the lower end of the rod 280 is threadably connected to the clamp member 272 and non-rotatably secured thereto by a lock nut 286. The axially opposite or upper end of the rod 280 includes a threaded section 288 for receiving first and second lock nuts 290. By axially locating the nuts 290 relative to the upper surface of the sleeve 282, it will be seen that the downward stroke of the power cylinder can be adjusted relative to the finger mechanism 216 for accommodation of combination shock absorber-leveling units 10 of varying axial dimensions.

Figure 13:
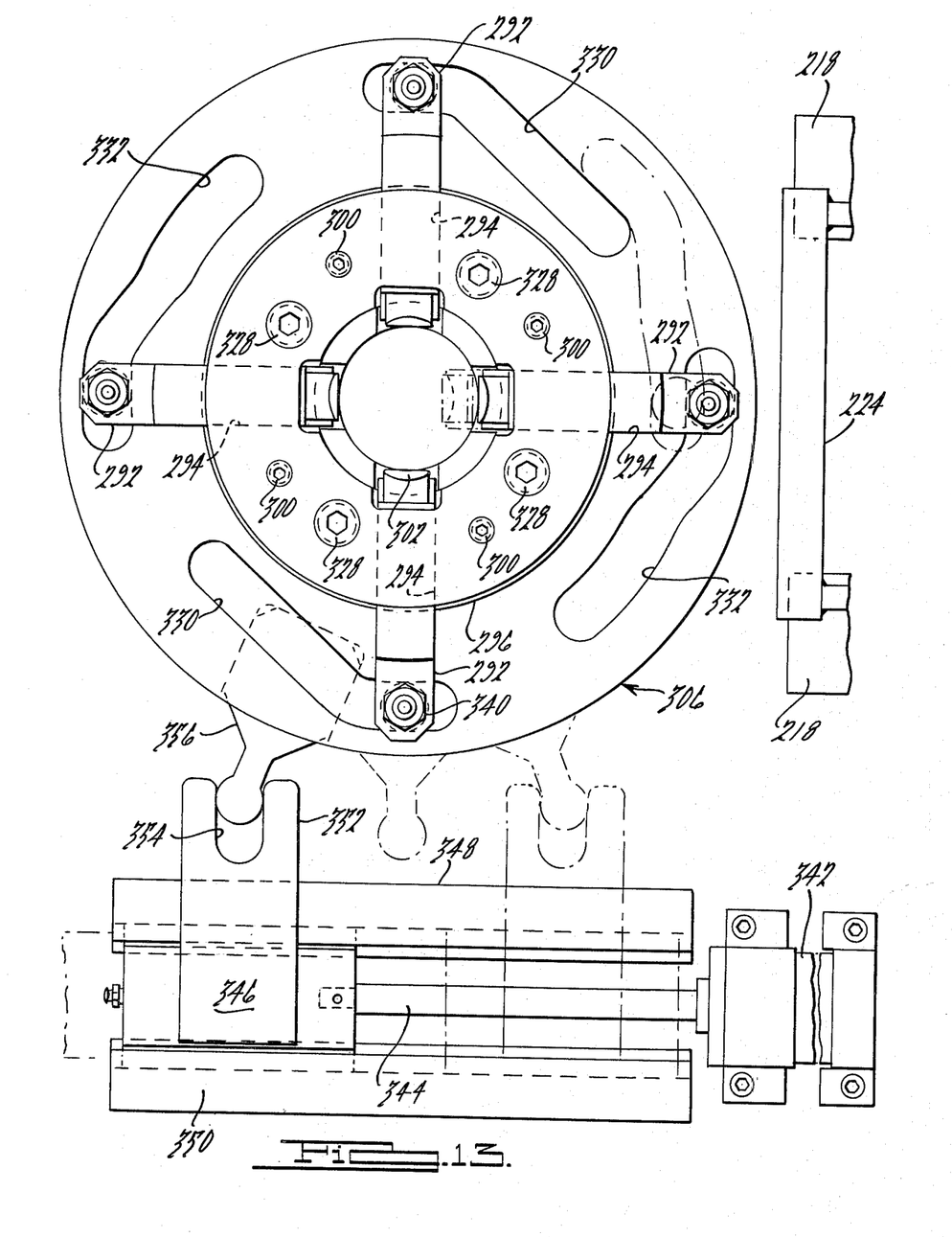
FIG. 13 is a top or plan view of the lower end of the apparatus illustrated in FIG. 12 looking in the direction of the arrow 13.

With reference to FIGS. 12 and 13, the finger mechanism 216 includes a plurality of radially extending, circumferentially spaced finger blocks 292 slidably supported in rectangularly shaped grooves 294 formed in an upper surface of an annularly shaped guide plate 296. The blocks 292 are movably secured in the grooves 294 by a retainer plate 298, the latter being connected to the guide plate 296 by a plurality of circumferentially spaced bolts, screws or the like 300. A finger element 302 is connected at the inner end of each of the blocks by suitable fastener elements 304 and each extends upwardly relative to the upper surface of the plate 298 whereby to accommodate engagement of the elements 304 within the lower end of the diaphragm 44, as shall hereinafter be explained. The radially outward end of the finger blocks 292 are slidably supported on an upper surface of a cam plate 306 which includes an inwardly extending flange section 308 which is located in an annularly shaped recess 310 formed at the lower end of the guide plate 296. The cam plate 306 is axially supported for rotational movement relative to the guide plate 296 by a ring shaped retainer element 312 which is fixedly connected to a lower surface of the guide plate 296 by a plurality of suitable fastener means 314.

In the subject invention, the finger mechanism 216 is resiliently supported relative to the worktable 220. In this regard an annularly shaped support member 316, having an outward radially extending flange 318, is connected to the work supporting table 220 via a plurality of suitable fasteners 320. The support member 316 also includes an upwardly extending skirt or sleeve portion 322 which engages a centrally formed opening in the guide plate 296. A plurality of circumferentially spaced, vertically extending coil spring elements 342 are interposed vertically between the member 316 and the plate 296, the elements 324 having end portions engageably located in vertically aligned apertures formed respectively in the plate 296 and member 316. An alignment rod 325 is located interjacently within each of the spring elements 324 and provides a stop or limit for downward movement of the mechanism 216. The upper end of each of the apertures formed in the plate 296 are adjustably closed by threaded set screws or plugs 328, the latter providing an adjustment means for vertically locating the mechanism 216 relative to the press 214 and table 220. Moreover, relative rotational movement between the mechanism 216 and the worktable 220 is precluded by a pin and set screw (not shown) located in a slot formed in the skirt or sleeve portion 322 of the member 316.

As best seen in FIG. 13, the plate 306 includes a number of circumferentially extending camming slots or recesses 330 and 332 in conformance with the number of finger blocks 292. To radially displace the blocks 292, one end of each of the slots 330 and 332 are radially spaced relative to the vertical axis of the mechanism 216 a greater distance than an opposite end. Each of the finger blocks 292 are operatively connected to the plate 306 by a camming roller 334 engageably disposed in one of the camming slots 330 or 332. The rollers 334 are connected to the outer end of the finger blocks 292 via a threaded support section 336 which also preferably includes a suitable lubricating fitting 340.

In the subject invention, the finger mechanism 216 is rotated in response to reciprocal movement of a fluid actuated cylinder 342, the cylinder 342 including a connecting rod 344 having an outer end connected to a slide block 346. The block 346 is slidably supported between a pair of laterally spaced keeper plates 348 and 350, and includes a transversely extending lug or ear section 352 including an inwardly extending camming slot 354. The slot 354 is drivingly engaged by a complementarily formed camming element 356 connected to the lower end of the cam plate 306. Thus, in response to reciprocal movement of the cylinder 342, the cam plate 306 is rotated through an arc conforming generally to the circumferential distance between opposite ends of the slots 330 and 332. In accordance therewith, each of the finger blocks 292 will be radially displaced outwardly a predetermined distance relative to the central vertical axis of the mechanism 216 in dependence on clockwise or counterclockwise rotation respectively.

To operate the apparatus 210 whereby to invert and sleeve the diaphragm 44 to the lower end of the dirt shield 36, it will be initially assumed that each of the finger blocks 292 are inwardly radially located relative to the central vertical axis of the mechanism 216, and that the shaft 250 of the press 214 is in its upper retracted position as illustrated in FIG. 12. Moreover, the combination shock absorber-leveling unit 10 is further assumed to be pre-assembled in conformance with FIG. 4. To commence the operation, the shock absorber 12 is compressed manually, the lower end of the diaphragm 44 is telescopically disposed over each of the finger elements 302, and the upper end cap 40 and attachment ring 42 are nestingly located in the recess 278 of the adaptor 276 at the lower end of the shaft 258. To facilitate the above, a suitable guiding or locating means 356 can be provided which preferably can be fixedly connected to the end plate 224. In response to actuation of the power cylinder 342, the cam plate is rotated counterclockwise to displace the finger elements 292 outwardly. Because of the engagement of the finger elements 302 within the lower end section 56 of the diaphragm 44, the section 56 will be deformably stretched in an outer direction. With the section 56 of the diaphragm in the aforementioned condition, the power cylinder 262 of the press 214 is actuated. The initial portion of the stroke of the power cylinder 262 results in the lower end of the dirt shield 36 engaging the radially expanded portion of the diaphragm 44 interjacently of each of the finger elements 302. As the dirt shield 36 continues to be driven downwardly, the end of the diaphragm 44 is peeled or slidably removed from the elements 302 and invertingly repositioned on the lower peripheral surface of the shield 36. Thus, in accordance with the inverting and sleeving steps, the combination shock absorber-leveling unit 10 will assume the preassembled condition depicted in FIG. 5.

The next step in the assembly of the unit 10 involves axially locating the return bend 54 of the diaphragm relative to the end attaching or mounting rings 20 and 42 in accordance with pre-determined dimensional relationship therebetween. The process involves placing the unit 10 in a locator fixture and pressurizing the variable volume chamber 46 defined by the dirt shield 36 and the diaphragm 44 whereby to bias the end portion 56 of the diaphragm 44 toward the open end of the dirt shield 36 and seat the return bend 54 against a locating shoulder as shall hereinafter be described. The locator fixture for accomplishment of the above indicated procedure is indicated generally at 360 in FIGS. 14 and 15. Generally speaking, the fixture 360 comprises a base plate 362, first and second longitudinally spaced mounting ring receiving blockd 364 and 366, and a full encirclement locking device 368 located longitudinally between the blocks 364 and 366.

Figure 14:
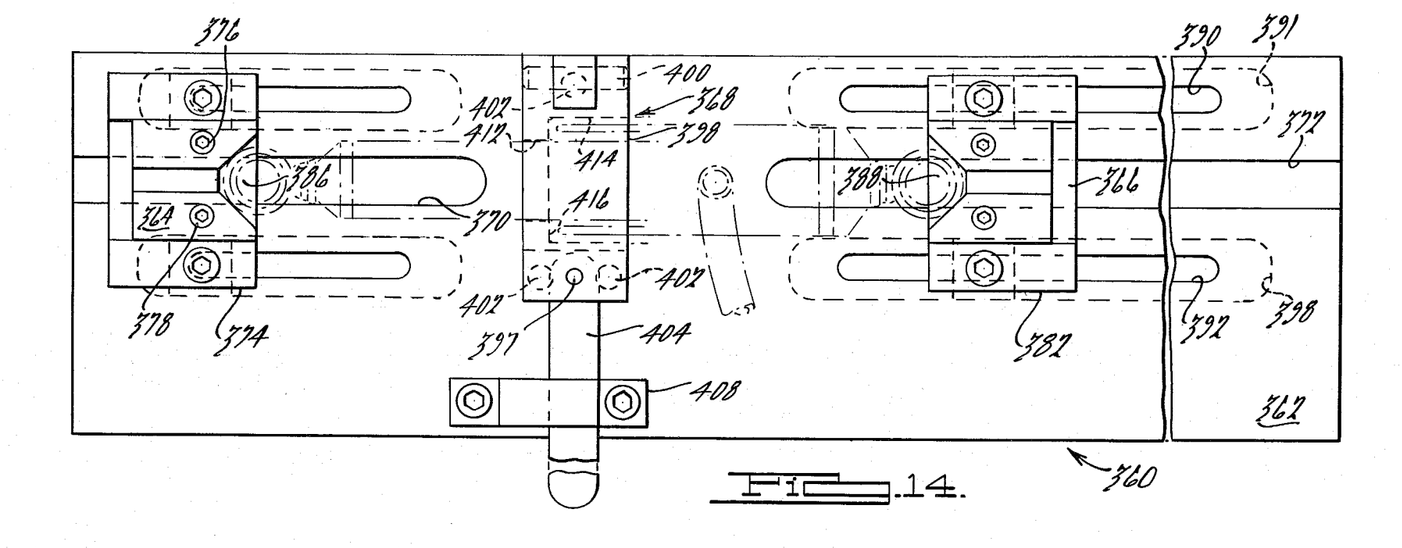
FIG. 14 is a top or plan view of a fixture adapted to axially locate the return bend of the flexible diaphragm relative to the dirt shield of the leveling strut in accordance with the step of the method also illustrated in FIG. 5.
Figure 15:
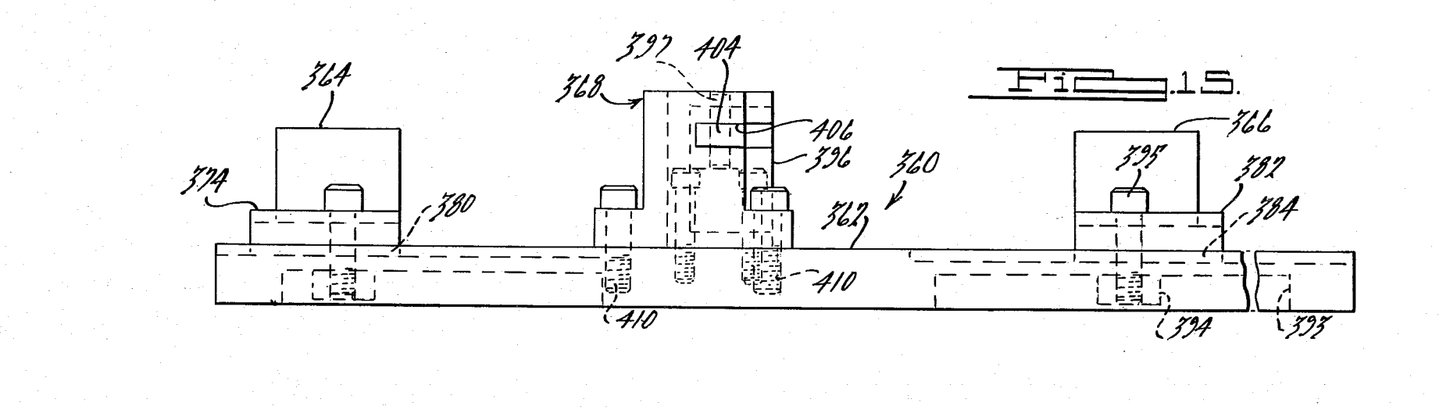
FIG. 15 is a side elevational view of the fixture illustrated in FIG. 14.

The base plate 362 is provided with a pair of longitudinally spaced inwardly extending recesses or grooves 370 and 372 which are utilized to coaxially align the blocks 364 and 366. Toward this end, the block 364 is connected to a slide block 374 by a pair of laterally spaced fastener means indicated at 376 and 378 respectively. The slide block 374 includes a downwardly extending, rectangularly shaped tongue 380 which cooperatively engages the slot 370. In a like manner, the block 366 is connected to a second slide block 382 also having a tongue 384 which is disposed in the slot 372. The receiving blocks 364 and 366 are respectively adapted to receive either the cap member 18 or mounting ring 20 disposed at the lower end of the reserve tube 14 and the attachment ring 42 or end cap 40 disposed at the upper end of the dirt shield 36. To facilitate the above and by way of example assuming the rings 20 and 42 are to be accommodated, the block 364 is provided with a recess having inwardly tapered sidewalls which are adapted to nestingly receive an outer peripheral surface of the mounting ring 20. On the other hand, the block 366 includes comparable recess 388 also having inwardly tapered sidewalls which are adapted to receive the outer peripheral surface of the attachment ring 42. In the present fixture 360, the location of each of the receiving blocks 364 and 366 is longitudinally adjustable relative to the assembly 368. In this regard the base plate 362 includes a pair of laterally spaced, longitudinally elongated passages 390 and 392 each of which includes a counterbored lower section 391 and 393 respectively. The slide block 382 is immovably connected to the base plate 362 via a pair of suitable, laterally spaced, fastener elements 396, the elements 396 being threadably engaged to a square headed nut 394. The distance across the flats of the nuts conforms generally to the width of the lower section 391 and 393 to facilitate loosening and tightening the elements 396 solely from the top side of the plate 362. Since the receiving block 364 is connected to the base plate 362 at the opposite longitudinal end thereof in an identical manner, the detailed description is omitted for purposes of simplicity.

The locking ring assembly 368 is comprised of upper and lower split collar elements 396 and 398 which are pivotably connected at one end by a suitable dowel pin 400. The lower element 396 is fixedly connected to the base plate 362 by suitable fasteners which are indicated generally at 402. One end of a laterally extending operating lever is pivotably connected to the upper collar element 396 via a pivot pin 397 with an opposite end of the lever 404 being adapted to be nestingly received in a groove or recess 406 formed in a lever retaining block 408 whereby to secure the elements 396 and 398 in a relatively closed position. On the other hand, the lever 404 can be pivoted out of the recess 406 to permit the upper element to be pivoted about the pin 400 to facilitate the receipt of the combination unit 10 in the fixture 360. The retaining block 408 is fixedly connected to the base plate 362 by a pair of suitable bolts, screws or the like 410 which are longitudinally spaced and threaded into suitably formed apertures therein.

In the closed position, the collar rings 396 and 398 form a pair of coaxial passages 412 and 414 which define a radially extending shoulder 416. The diameter of the passage 413 conforms substantially to the diameter of the reserve tube 14 and the diameter of passage 414 conforms to the diameter of the dirt shield 36 including the sleeved end portion of the diaphragm 44. When the combination shock absorber-leveling unit 10 is disposed in the fixture 360, the shoulder 416 is adapted to seat or locate the return bend 54 of the diaphragm 44 in response to pressurizing the variable volume chamber 46 formed internally of the shield 36 whereby the end portion 56 is slidably displaced relative to the open end of the shield 36. The introduction of the pressurized media is accomplished by connecting a suitable source of pressurized fluid such as an air hose 417 to the threaded nipple 47 normally utilized to support the valve assembly 48.

Figures 6, 7:
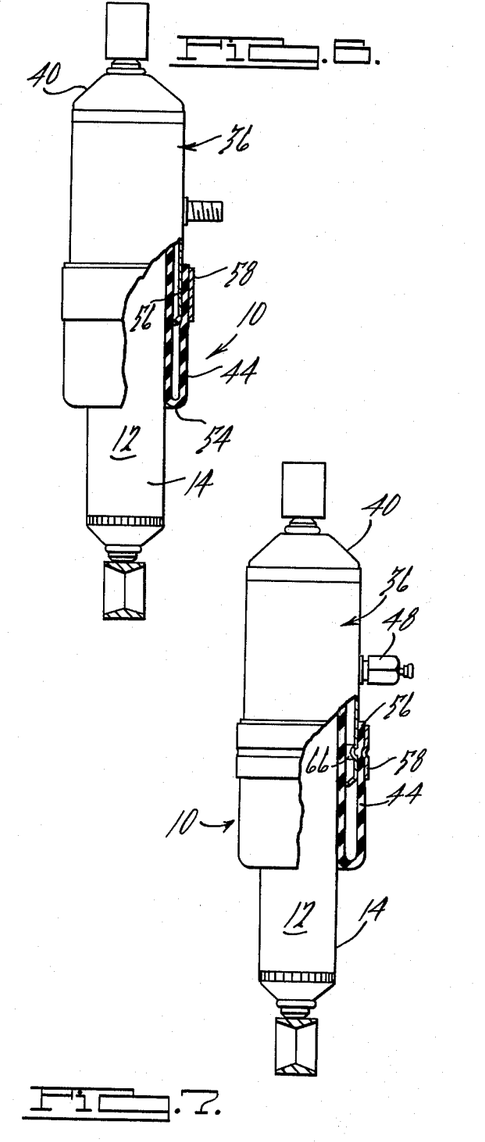

With the return bend now properly located on the combination shock absorber-leveling strut 10, the chamber 46 can be depressurized by disconnecting the fluid source from the threaded nipple 47. As best seen in FIG. 6, the next step involves locating the clamping ring 58 around the end portion 56 of the diaphragm 44 and fixedly securing the ring 58 therearound. In this regard a modified version of the crimping machine 80 is provided utilizing a different set of crimping fingers 184 whereby to accommodate for the larger diameter of the diaphragm 44 sleeved about the shield 36. Moreover, the supporting fixture 82 is also of a modified form to facilitate locating the clamping ring 58 relative to the crimping mechanism 104. In the modified version, the stop element 198 is removed to permit the dirt shield 36 to be extended axially into the jaws formed by the crimping mechanism 104. For axially locating the clamping ring 58 relative to the jaws of the mechanism 104, a slot or groove indicated generally at 418 in FIG. 8 is disposed in the upper surface of the locator plate 196 which is adapted to engageably receive the threaded nipple 47. Since the modified version of the crimping machine and the assembly step for crimping the clamping ring 58 is identical to the machine 80 and the assembly step described in conjunction with crimping the clamping ring 62, reference may be had to the prior description and operation for the details thereof.

The remaining steps in the manufacture of the combination shock absorber-leveling strut 10 involves leak testing of the chamber 46. In this regard the unit 10 is preferably located in a test enclosure, wherein the chamber 46 is pressurized to a predetermined test level to ensure that the diaphragm 44 is fixedly secured at opposite ends to the reserve tube 14 and the dirt shield 36. During this procedure and as a safety precaution, it is desirable that the same type of screen or partition be provided between the unit 10 and the individual performing the test. Thereafter, the strut 10 is preferably submerged in water and air tested whereby to establish air tightness of the chamber 46. After testing, a predetermined quantity of silicon or other suitable anti-friction lubricant is preferably injected into the chamber 46 to obviate any tendency of adjacent portions of the diaphragm 44 from adhering together. Thereafter, the valve assembly 58 is connected to the nipple 47, the outer surface of the combination unit 10 is painted and the individual units are packed in suitable packing cases or cartons, thus completing the manufacturing procedure.

It will be seen from the foregoing that the present invention provides a novel method of assembling a combination shock absorber-leveling strut and includes novel apparatus for performing the various assembly steps. It will be noted that the individual apparatuses and fixtures utilized in the assembly are each adapted to assure close quality control and minimize to the extreme the number of successive operational steps. Moreover, it will be observed that a new and improved means for sleeving one end of the diaphragm 44 over the dirt shield 36 has been disclosed which is rapid, effective and which assures a positive sealing engagement therebetween. Another important advantage of the subject method resides in the manner in which one end of the diaphragm is selectively positioned in response to the introduction of the pressurized media.

While it will be apparent that the exemplary method and apparatus for accomplishing the method herein described is well calculated to fulfill the objects above stated, it will be appreciated that the method of the present invention, including the apparatus for performing the method are both susceptible to modification, variation and change without departing from the scope of the invention.

I claim:

1. In the assembly of a combination shock absorber-leveling unit of the type including a shock absorber having a piston and piston rod supported for reciprocal movement in a body member, a dirt shield connected to the piston rod and a diaphragm defining a flexible partition between the body member and the dirt shield, an apparatus for crimping a clamping ring premounted to the diaphragm comprising:

a support structure for coaxially and axially supporting the clamping ring, diaphragm and portion of the shock absorber unit to which the ring and diaphragm are to be attached;

a plurality of crimping dies supported by said structure, each of said dies having a first position spaced a preselected distance from said clamping ring and a second clamping position, each of said dies having a concave-shaped working face, the faces substantially fully encircling the ring when said dies are in said second position; and actuating means including roller means guidably supporting a portion of said combination unit for displacing each of said dies from said first position to said second position wherein said faces compressively circumferentially engage said clamping ring and whereby said diaphragm is fixedly secured to said portion of said unit and in fluidtight engagement therewith.

2. The apparatus as recited in claim 1 which includes means for locating said clamping ring relative to said crimping dies.

3. The apparatus as recited in claim 1 wherein said plurality of crimping dies are circumferentially spaced relative to a longitudinal axis of said support structure, and wherein said actuating means further includes a power cylinder coaxially supported relative to said longitudinal axis.

4. The apparatus as recited in claim 3 which includes connecting means between said plurality of dies and said power cylinder for displacing said dies in response to actuation of said cylinder.

5. The apparatus as recited in claim 4 wherein said connecting means includes a shaft connected to said cylinder and a plurality of bell cranks pivotably supported by said structure, each of said bell cranks having one end connected to said shaft and an opposite end connected to one of said dies.

* * * * *